(No Model.) 2 Sheets—Sheet 1.
W. H. KNIGHT.
CONDUIT CONDUCTOR FOR ELECTRIC RAILWAYS.
No. 464,505. Patented Dec. 8, 1891.
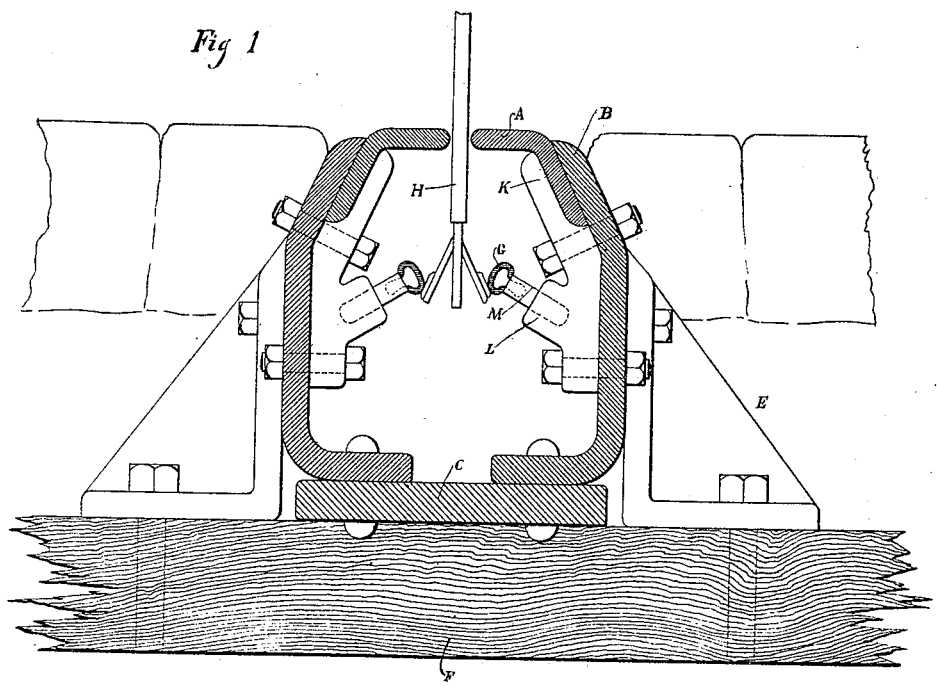
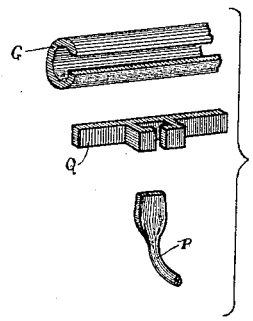
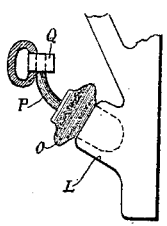
WITNESSES
Edward S. McKinney
Julien M. Elliot
INVENTOR
Walter H. Knight
by Bentley Knight
Attys.

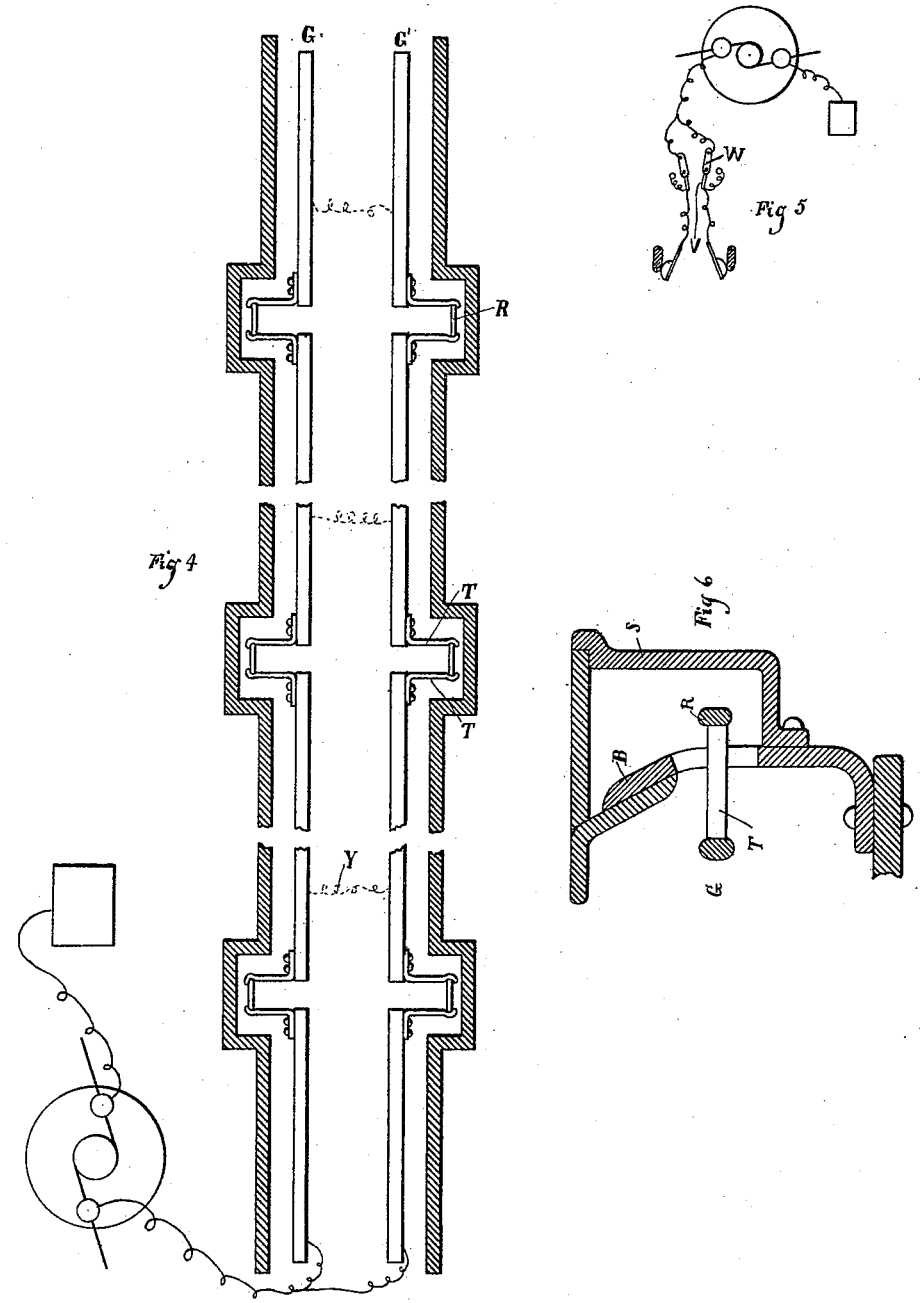

UNITED STATES PATENT OFFICE.

WALTER H. KNIGHT, OF NEW YORK, N. Y.

CONDUIT-CONDUCTOR FOR ELECTRIC RAILWAYS.

SPECIFICATION forming part of Letters Patent No. 464,505, dated December 8, 1891.

Application filed August 4, 1888. Serial No. 281,926. (No model.)

*To all whom it may concern:*

Be it known that I, WALTER H. KNIGHT, a citizen of the United States, residing at New York, in the county of New York and State of New York, have invented certain new and useful Improvements in Electric Railways, of which the following is a specification.

My invention relates to electric railways; and it consists in certain details relating to a conduit and the supply-conductors for an electric railway contained therein. In the construction of a conduit I have found it advisable to provide a slot-rail which shall be readily removable without interference with the pavement or general construction, and that for this purpose the conductors within the conduit should be supported from the substructure, carrying the slot-rails so as not to interfere with the removal of the said rail. I have also found it desirable when the conduit itself or the rails of the track are employed as one part of the circuit that there should be within the conduit two well-insulated conductors, substantially as in the case when there is no electrical connection whatever with the conduit or rails. The two conductors, however, should both be connected to the same terminal of the machine, and, if necessary, connected across at intervals. To obtain the full advantage of this arrangement, however, I have found it necessary to divide each of the conductors into sections, which sections shall be connected normally through safety-fuses, so that in case of a ground connection with either conductor but one section of one conductor will be cut out by the melting of the fuses and no interruption in the general operation of the road will take place since the connection with the propelling-motor will still be maintained through the opposite unbroken conductor.

Referring to the accompanying drawings, Figure 1 is a transverse section of a conduit and roadway, showing my improvements. Fig. 2 shows the details of the connection between the main conductor and a support. Fig. 3 shows an insulator. Fig. 4 is a plan showing the sectional conductors with the safety-fuses. Fig. 5 is a diagram of the motor connection; and Fig. 6 is a transverse section of a conduit, showing on a larger scale the conductor with a safety-fuse.

In Fig. 1, A represents a slot-rail of an obtuse angular section.

B is a plate extending continuously to form the side of the conduit.

C is a bottom-plate.

E is a bracket placed at intervals to give lateral stiffness to the structure.

F is a railway-tie.

G is the main conductor made in the form of an oval tube split at the back, and H is a contact-plow—such, for instance, as is shown in my patent, No. 338,175, of March 16, 1886.

K is a bracket bolted to the interior of plate B and having a socket L, holding insulator M. In the upper part of bracket K is a recess, in which is seated one leg of the angular slot-rail A. By this arrangement the slot-rail is firmly held between K and the side B, and yet, as will be readily understood, the slot-rail can be readily withdrawn and replaced at will.

In Fig. 1 the insulator M is shown in the form of a cylinder fitting into socket L and having in its outer end a pin engaging with conductor G. My preferred form of insulator, however, is shown in Figs. 2 and 3. In this form O is the insulator seated in socket L and provided with a flange. P is a metallic pin fixed in insulator O and at its outer end having a tapered tip adapted to engage with a loop on the back of block Q. This block Q is adapted to fit into the channel of conductor G with its posterior loop projecting through the slot, as shown in Fig. 3. By this device attachment is readily made with the conductor at any point and the conductor left free to slide longitudinally. The block Q is inserted at the end of one section of G and slipped along until it comes opposite pin P, when the loop is dropped onto the tip of the pin.

In Fig. 4, G and G' are the two conductors divided into sections, the sections being connected by a fusible plug R. This plug is held in position by two spring-arms T, extending from the ends of two adjacent conductor-sections respectively. These two arms extend back from the conductor through the wall B of the conduit into a box or pocket S on the outside of the conduit. This box S has a removable cover on the surface of the street, so that the plugs may be easily renewed. In practice the two conductors will be connected with the same poles of the dynamo and also with one pole of the motor on the car by means of the ordinary contact device. The contact device will have two insulated conductors extending through the slot, as shown in my said patent, and each of these two will be provided with a safety-fuse V and a switch W, as shown in Fig. 5. As the vehicle propelled by the motor proceeds along the line, it will receive current from both supply-conductors and through both conductors of the contact device. If, however, there has been an accidental ground connection upon one of the supply-conductors, that section will be cut out by the fusing of plugs R. The vehicle, however, will not be stopped as it will still receive current from the other conductor. There will be, however, an indication upon the car that a section is grounded by the melting of safety-fuse V when one of the contact-pieces comes onto the grounded section of the supply-conductor. The operator will, however, by turning the switch W, ascertain which of the two conductors is grounded, and then, by leaving one of the switches W open, he will receive his current in the normal manner and will proceed as before, getting current, however, from only one of the conductors G G'.

What I claim as new, and desire to secure by Letters Patent, is—

1. In a conduit for an electric railway, the combination, with a slot-rail, of a substructure therefor, a socketed bracket attached to the interior of the said substructure, an insulator in said socket, and a main supply-conductor supported by the insulator.

2. The combination, with a main supply-conductor inclosed in a slotted conduit, of a block on the posterior side of the conductor and movable thereon, and an insulator having a metallic pin engaging with the said block.

3. The combination, with a hollow conductor, of a block adapted to slide therein, provided with a projecting loop, and a pin attached to an insulator adapted to fit into the said loop.

4. In an electric railway, the combination of a sectional supply-conductor with safety devices normally included in circuit between succeeding sections thereof.

5. In an electric railway, the combination of two main sectional supply-conductors connected to one terminal of the generator, with safety devices between the conductor-sections.

6. The combination, with a main sectional supply-conductor inclosed in the conduit, of safety devices between the sections, and an inclosing box for said devices extending to the surface of the roadway and provided with a removable cover.

7. The combination, with an insulated supply-conductor inclosed in a conduit, of a safety device between two adjacent sections of said conductor, and an inclosing box outside of the conduit in which said device is contained.

8. The combination, in an electric railway, of two supply-conductors inclosed in a conduit and connected to one terminal of the generator with a contact device therefor having two insulated conductors leading to one terminal of the motor, each of said two conductors having a circuit-breaker for interrupting the connection at will.

9. In an electric railway, the combination of two supply-conductors inclosed in a slotted conduit and connected to one terminal of the generator, safety devices connecting succeeding sections of said conductors, and a contact device having two insulated conductors, each of the two conductors having a safety device and a circuit-breaker.

WALTER H. KNIGHT.

Witnesses:
ROBT. W. BLACKWELL,
JULIUS M. ELLIOTT.